Figure 6:
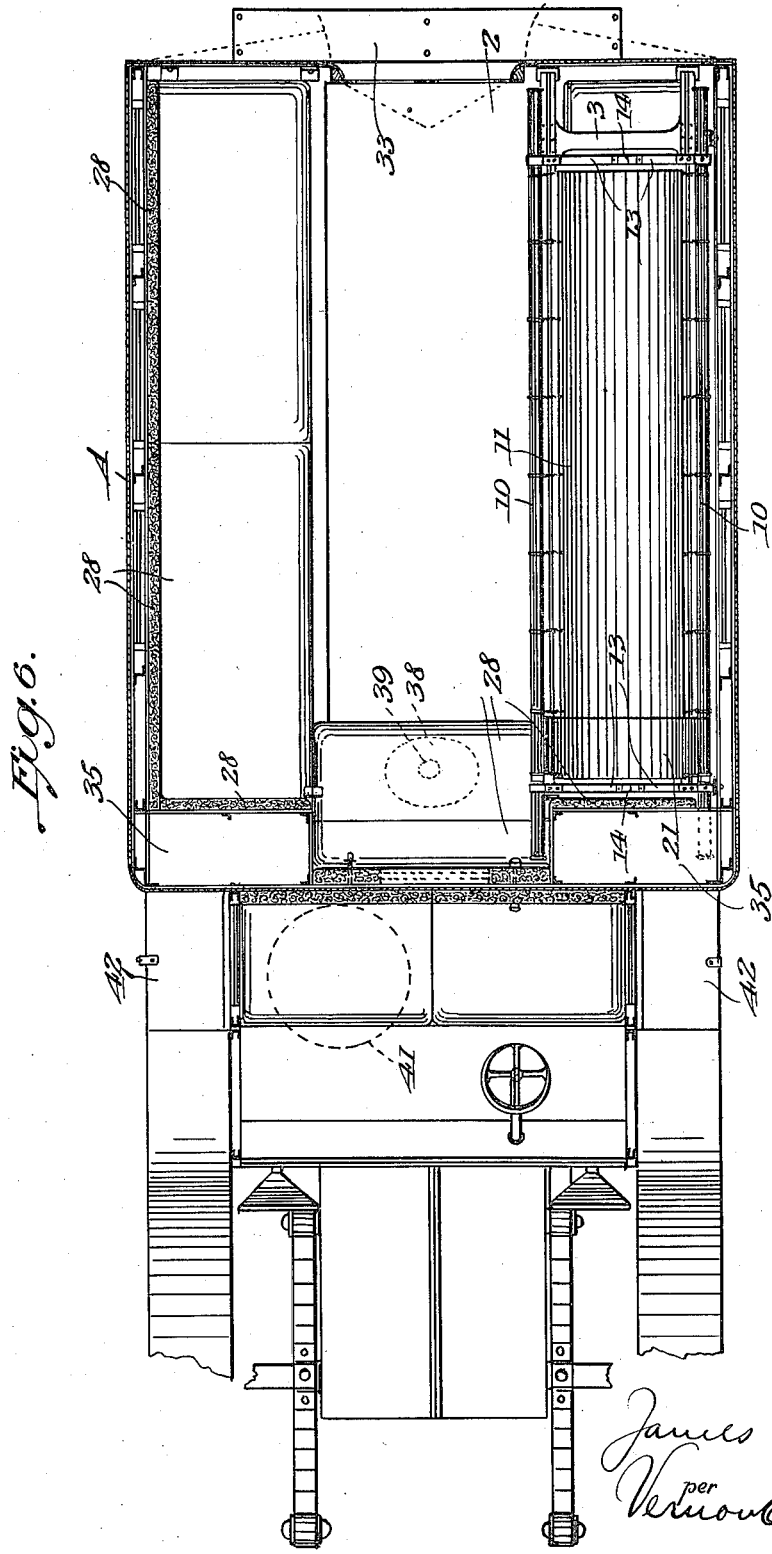

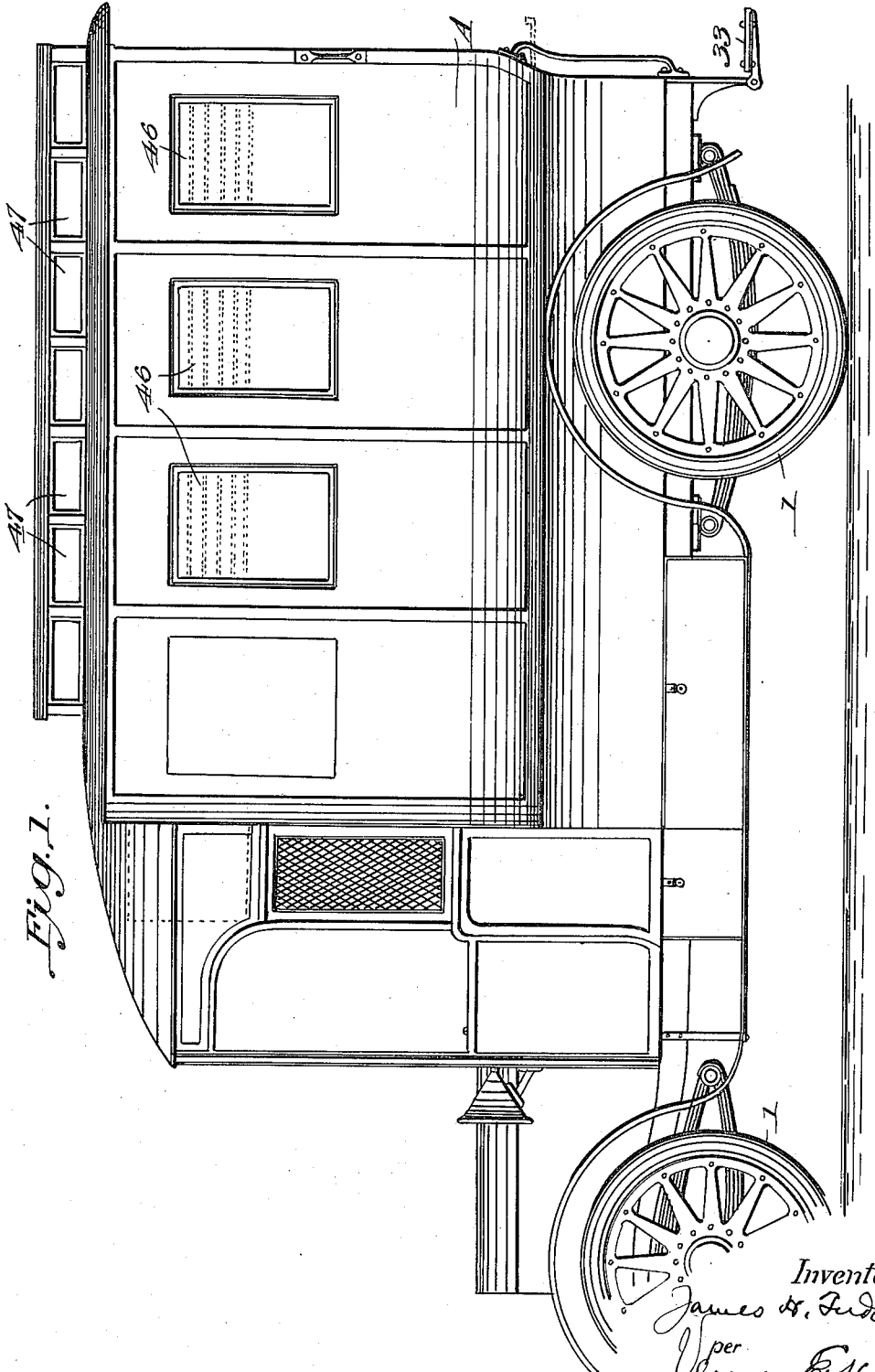

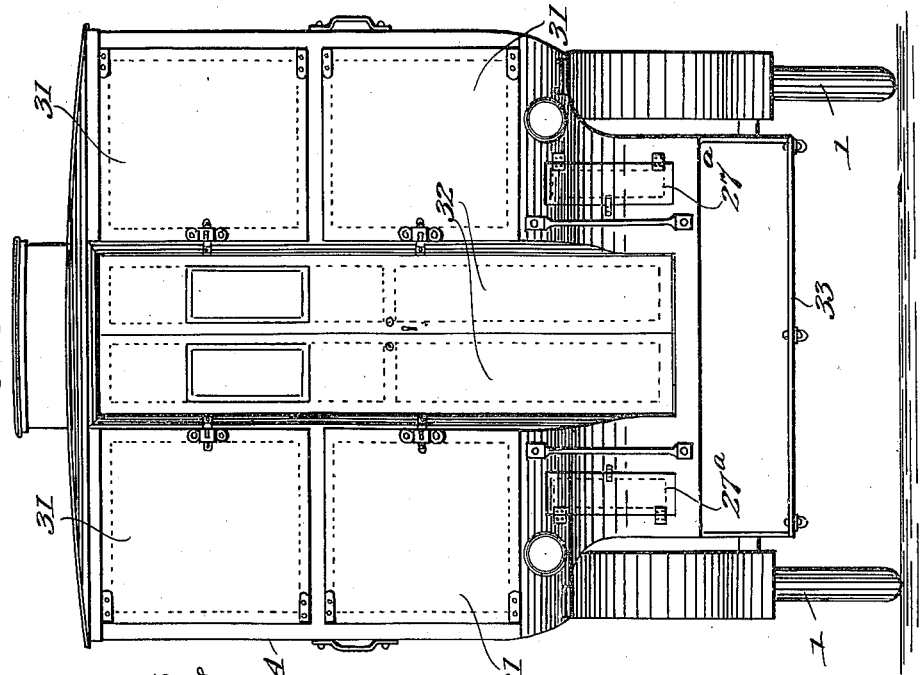
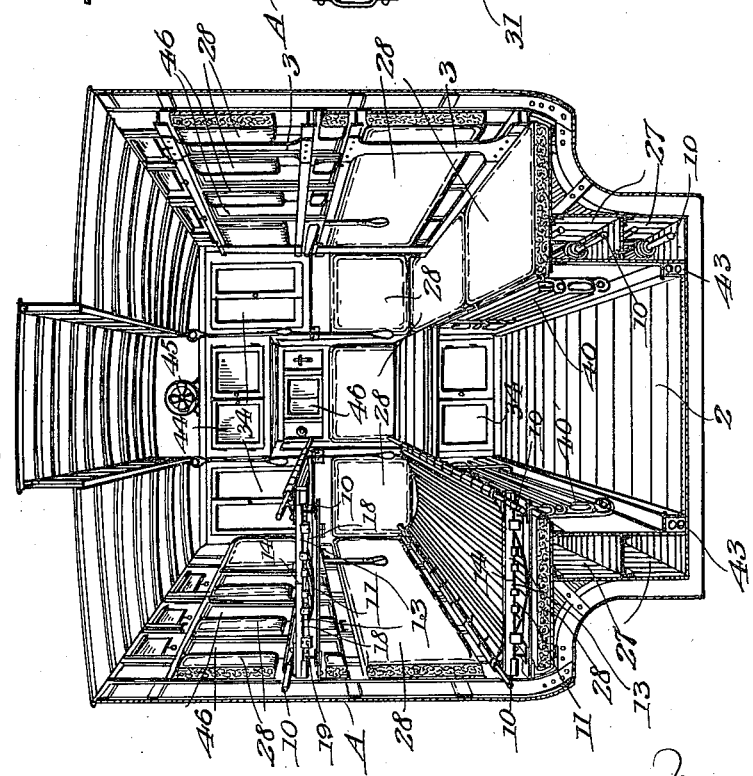

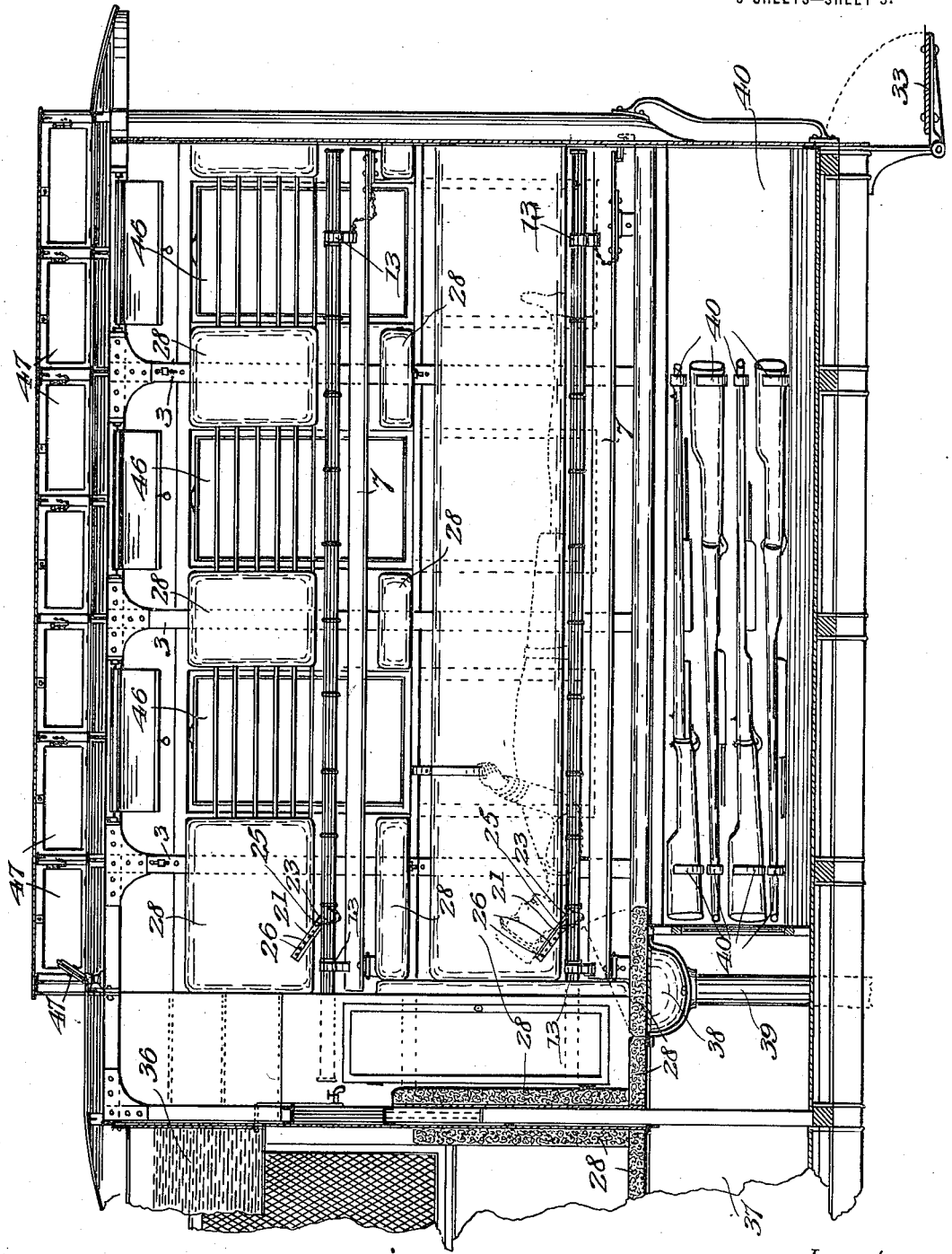

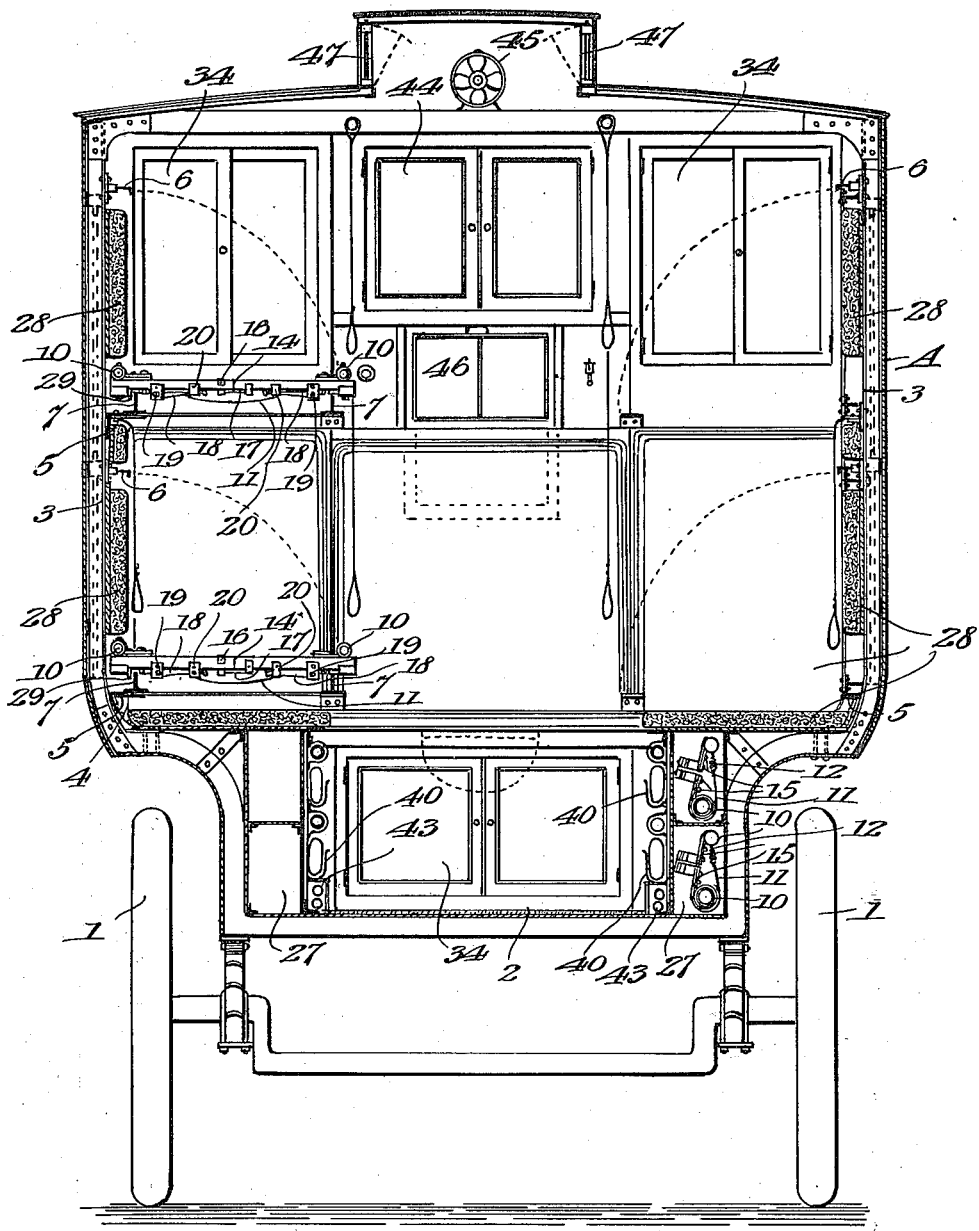

J. H. TUDOR.
FIELD AMBULANCE.
APPLICATION FILED AUG. 14, 1915.

1,178,360.

Patented Apr. 4, 1916.
6 SHEETS—SHEET 5.

Inventor
James H. Tudor
per
Vernon E. Hodge
Attorney.

J. H. TUDOR.
FIELD AMBULANCE.
APPLICATION FILED AUG. 14, 1915.
1,178,360.
Patented Apr. 4, 1916.
6 SHEETS—SHEET 6.
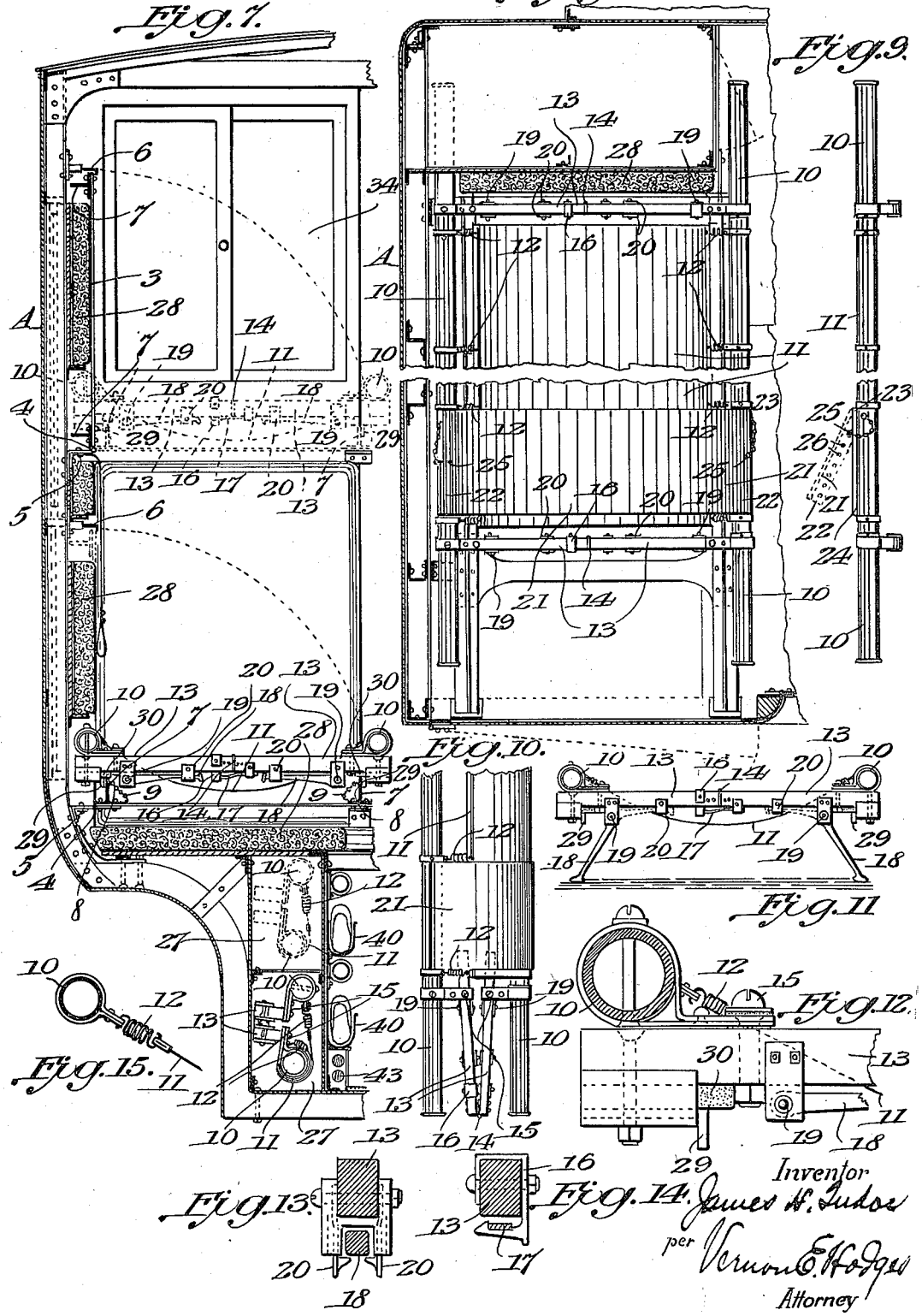

UNITED STATES PATENT OFFICE.

JAMES H. TUDOR, OF LEXINGTON, KENTUCKY, ASSIGNOR OF ONE-FOURTH TO ADDISON W. CREEKMORE, OF LEXINGTON, KENTUCKY.

FIELD-AMBULANCE.

1,178,360.   Specification of Letters Patent.   Patented Apr. 4, 1916.

Application filed August 14, 1915. Serial No. 45,492.

*To all whom it may concern:*

Be it known that I, JAMES H. TUDOR, citizen of the United States, residing at Lexington, in the county of Fayette and State of Kentucky, have invented certain new and useful Improvements in Field-Ambulances, of which the following is a specification.

My invention relates to an improvement in field ambulances, and the object is to provide a motor car ambulance with appointments for safety, convenience and comfort, and with means for packing and storing the appliances required for use with the ambulance in compact, secure and convenient form.

In the accompanying drawings, Figure 1 is a view in side elevation; Fig. 2 is a view in rear elevation; Fig. 3 is an interior perspective view looking from the rear toward the front; Fig. 4 is a longitudinal sectional view; Fig. 5 is a transverse vertical section; Fig. 6 is a horizontal section; Fig. 7 is an enlarged transverse vertical section; Fig. 8 is a horizontal section enlarged over one of the stretchers, the parts broken away; Fig. 9 is a side view of one of the stretchers corresponding to Fig. 8; Fig. 10 is a view of a stretcher partly rolled; Fig. 11 is an end view; Fig. 12 is an enlarged fragmentary view; and Figs. 13, 14 and 15 are enlarged sectional details.

A represents the body of the vehicle and 1 represents the wheels. As shown in Fig. 3 there is preferably an aisle 2 through the center dividing the ambulance into two parts longitudinally, for the accommodation of four or even double that number of stretchers, according to the length of the vehicle, provision being shown in the accompanying drawings for two stretchers on each side.

The numeral 3 indicates a stretcher frame, there being two for each side in the ambulance shown, and these are hinged at 4 to the horizontal side flanges 5, and spring catches 6 are in position, as shown in Fig. 7, to hold the stretcher frame in a vertical position when folded up out of the way, the stretcher frames swinging from their hinges at the center as indicated by the curved dotted lines in Fig. 7. Two inverted T-bars 7 extend longitudinally of each stretcher frame, the head of each bar being bolted to the frame. The stretcher when in use is
supported upon and adapted to be removably secured to these inverted T-bars by
pins or other means 8 held by the chains 9.

The stretcher as shown in Figs. 8, 9, 10,
11 and 12, comprises two side poles 10, preferably pipes or tubes, the ends of which
form handles, to which poles the canvas 11
forming the body of the stretcher is suspended by means of springs 12; and end
bars 13 which are made in sections are connected at the center by hinge 14 and by bolts
15 which permit the end frames to bow out
as shown in Fig. 10 when the stretcher is
collapsed. One pole is capable of turning
in one end of the end bars in order to wind
the canvas thereon when the stretcher is
collapsed as appears in Figs. 7 and 10. A
rigid catch 16 secured to one section of each
end frame is in position to receive a spring
catch 17 and hold the end frame rigid when
in their normal positions. Legs 18 are
hinged at 19 to the end frames of the stretchers and are capable of being swung into
the two extreme positions shown in Fig. 11,
to rest and hold the stretcher upon the
ground, or as in Fig. 12 to hold it beneath
the end frame when the stretcher is collapsed, as shown in Fig. 10, in which position the legs 18 are held between catches
20 as shown in Fig. 13.

The head rest 21 is made of canvas and secured at its ends to the bars 22 which latter
are hinged at their rear ends 23 to the poles
at the end of a slot 24 adapted to receive
these bars when the head rest is not in use,
and to regulate the tilt of the head rest the
pin 25 is placed in one of the holes 26 in
the bars 22 a greater or less distance from
the hinge 23, accordingly as the head rest is
to be adjusted lower or higher. Depending
flanges 29 embrace the T-bar runners 7 from
the outside as shown in Fig. 7 when the
stretcher is in place in the ambulance and
hard rubber slides 30 rest upon the T-bar
runner. The stretchers are slid into the
ambulance from the rear through the doors
31, one of which is provided for each
stretcher as shown in Fig. 2. When collapsed the stretchers are slid into the storage chambers 27 shown in Figs. 3, 5 and 7
of which there are preferably two on each
side of the center aisle 2, which storage
chambers are closed at the rear by the
doors 27ª.

Cushions 28 are provided both for seats and backs as shown in Figs. 3, 4, 5 and 7, and when the stretchers are removed and the stretcher frames 3 are folded up vertically as indicated in Figs. 5 and 7, the seat and back cushions 28 are in positions so that each side has a seating capacity for several passengers. The main doors 32 of which there are preferably two, close the center aisle. A collapsible step 33 at the rear is provided as a means of stepping into the ambulance. Various accessories are provided such as lockers 34 (see Fig. 5), storage 35 for blankets (see Fig. 6), water tank 36, petrol storage 37, detachable wash basins 38, and soil pipe 39, as well as gun racks 40 (see Fig. 4), hot water heater 41, tool box 42 (see Fig. 6). Heating coils 43 are provided as well as a medicine cabinet 44, an electric fan 45 and windows 46 and ventilators 47, as shown in Fig. 5.

I claim:

1. An ambulance having seat and side cushions, and a stretcher frame hinged therein at a point between the seat and side cushions approximately at the inner edge of the seat cushion, the frame constructed to straddle the side cushions when raised, and a fastening means for holding the frame in position.

2. An ambulance having seat and side cushions, recesses between the lower edge of the side cushion and rear edge of the seat cushions, a stretcher frame provided with rails hinged therebetween and recesses arranged at the upper edge of the side cushions, said upper and lower recesses adapted to receive and conceal the rails of said stretcher frame when raised.

In testimony whereof I affix my signature.

JAMES H. TUDOR.